Dec. 26, 1939.  C. C. COONS  2,184,991
RECTIFIER FOR ABSORPTION REFRIGERATORS
Filed Oct. 10, 1935
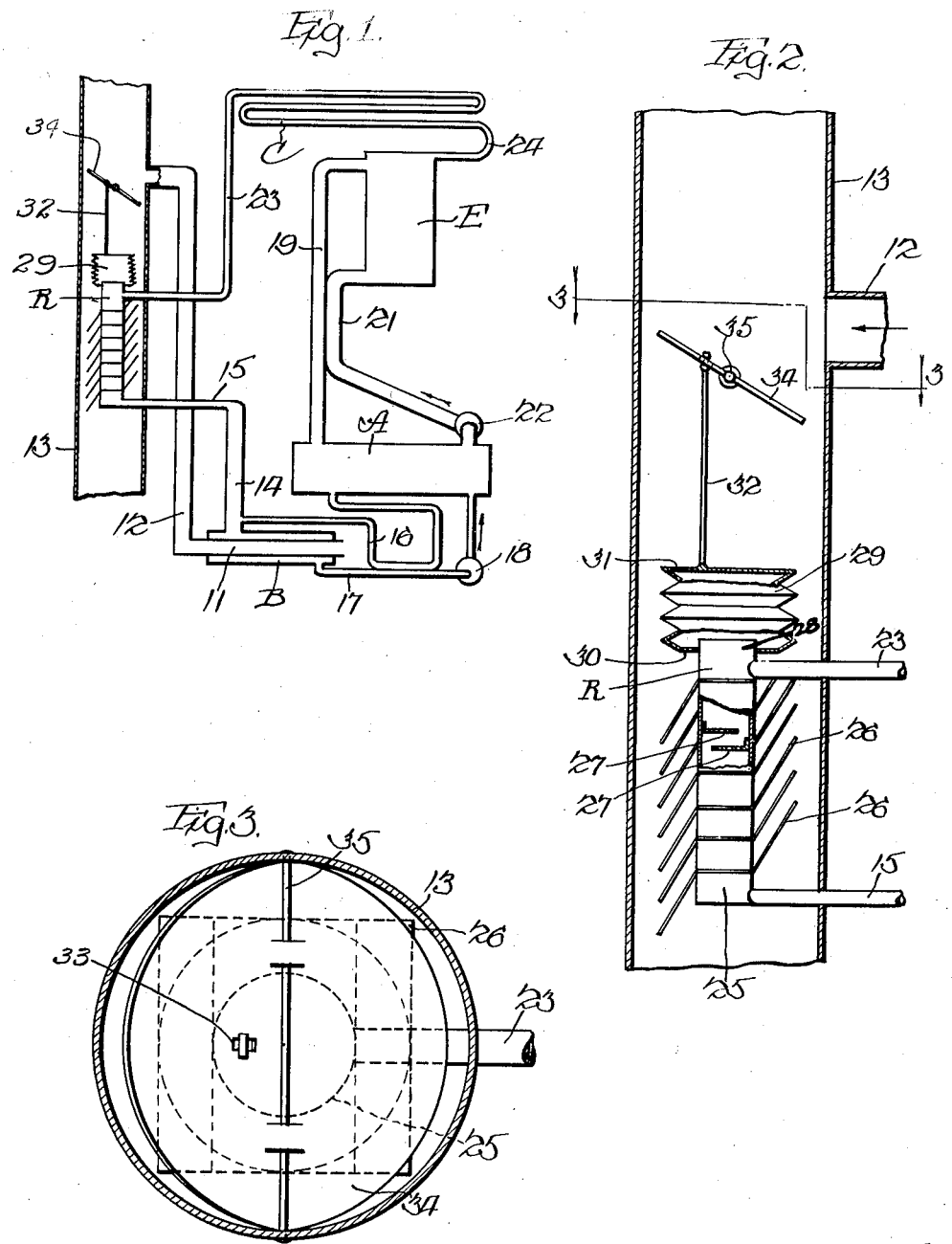
Inventor:
Curtis C. Coons
By Harry S. Demaree
Atty.

Patented Dec. 26, 1939

2,184,991

UNITED STATES PATENT OFFICE 2,184,991

RECTIFIER FOR ABSORPTION REFRIGERATORS

Curtis C. Coons, North Canton, Ohio, assignor to The Hoover Company, North Canton, Ohio, a corporation of Ohio Application October 10, 1935, Serial No. 44,369

11 Claims. (Cl. 62—5)

This invention relates to absorption refrigerating apparatus and more particularly to rectifiers adapted to be used in connection with the boiler thereof for aiding in the separation of refrigerant from absorption liquid.

One of the difficulties met with in the absorption refrigeration art results from the fact that when heat is applied to the boiler of a refrigerating system to separate the refrigerant from the absorption liquid therein, a considerable amount of the absorption liquid also evaporates. If this passes with the refrigerant vapor into the condenser in too great a quantity it adversely affects the operation of the entire absorption system.

It is an object of the present invention to provide an improved rectifier for such a system and also control means for varying the temperatures of the rectifier in accordance with the operating conditions of the system, so that the rectifier may be maintained at the proper temperature to obtain efficient rectification. If the temperature of a rectifier in an absorption refrigerating system is maintained too high considerable absorption liquid vapor will pass into the condenser. On the other hand, if the temperature is maintained too low, too large a quantity of refrigerant will be liquified in the rectifier and this will result in inefficient operation. It is one object of the invention to provide means for regulating the temperature of the rectifier and thus maintain the optimum conditions for operation.

It is still another object of the invention to provide improved means for variably air cooling the rectifier of a refrigerating system to improve its operation.

Other objects and advantages reside in certain novel features of the arrangement and construction of parts as will be apparent from the following description taken in connection with the accompanying drawing, in which—

Figure 1 is a diagrammatic representation of a continuous absorption refrigerating system illustrating how a rectifier constructed in accordance with the present invention may be incorporated therein;

Figure 2 is a fragmentary vertical cross-sectional view of a rectifier and the associated parts, the arrangement illustrating the rectifier incorporated in the system of Figure 1; and Figure 3 is an enlarged horizontal cross-sectional view of the apparatus shown in Figure 2, the view being taken on the line 3—3 thereof.

Referring to the drawing in detail, and first to the refrigerating system diagrammatically illustrated in Figure 1, it will be seen that a continuous absorption refrigerating system is illustrated as composed of a boiler B, an absorber A, an evaporator E, a condenser C and a rectifier R, these parts being connected by various conduits as illustrated to form a complete system. The boiler B may consist of a horizontally disposed cylindrical vessel having a heating tube 11 passed horizontally therethrough. This heating tube may contain a gas heater or an electric heater or other suitable heating means. The end of the heating tube 11 may be connected to a vertically extending pipe 12 which may serve as a chimney and which is connected to a larger vertically extending conduit 13 which surrounds the rectifier R. The top of the boiler B may have a vertically extending conduit or dome 14 connected thereto and the top of this dome 14 may be connected to the bottom of the rectifier R by means of the horizontal conduit 15.

The absorber A may be of any known construction, the arrangement illustrated in Figure 1 consisting of a horizontal cylindrical vessel connected to the boiler B by two conduits 16 and 17 which may be in heat exchange relation, the conduit 17 having a liquid circulation pump 18 therein.

The system of Figure 1 is of the type in which an inert gas is circulated between the absorber and the evaporator, inert gas conduits being shown at 19 and 21 and portions of these may be in heat exchange relation as indicated. The evaporator E may consist of a vertically disposed cylindrical vessel that may have a number of baffle plates or the like therein in accordance with known construction. Inert gas may be caused to circulate between the evaporator and absorber by means of a gas pump indicated diagrammatically at 22.

The condenser C has its upper end connected to the upper end of the rectifier R by means of the conduit 23. The lower end of the condenser is connected to the top of the evaporator by conduit 24.

The rectifier R is shown in detail in Figure 2. It may consist of a vertically disposed cylindrical pipe 25 upon which a number of air cooled heat radiating or discharge fins 26 are connected, these having portions which extend horizontally across the cylinder 25 with depending projections secured to the lefthand side thereof, as viewed in Figure 2, and projections extending upwardly on the righthand side. This construction causes air which cools the rectifier to move across the vessel 25. On the interior of the rectifier cylinder 25, a number of baffle plates are indicated at 27. The conduit 23 which connects the rectifier to the condenser is joined to the cylinder 25 at a point just below its upper end, leaving a portion of said cylinder projecting above the point of connection of the conduit 23. The cylinder 25 is of course closed at the top and bottom and the upper portion serves as means for mounting a sylphon bellows 29 thereon, this bellows having an expansible element connected between the lower plate 30 which is fixed to the upper portion of the vessel 25 and an upper movable plate 31 which is moved up and down depending upon the pressure of the gas within the bellows. The upper movable plate 31 of the bellows carries the vertically extending rod 32 which may pass through a slot 33 in a damper 34 and be connected thereto to move the damper 34, the damper being pivotally mounted upon a supporting pin or shaft 35 which extends across the air conduit 13 as shown in Figure 3.

With this arrangement of bellows and damper, if the temperature of the rectifier becomes high the gas within the bellows 29 expands and the upper plate 31 is moved upwardly so as to move the damper towards a vertical position. If the temperature of the rectifier is lowered the gas in the bellows 29 contracts and the damper 34 is moved toward a horizontal position. In this way the amount of air drawn in through the lower part of the air conduit 13 and conveyed upwardly therethrough, in response to the current set up by the discharge of heat around the rectifier R and the addition of hot gases from the conduit 12, is varied depending upon the operating conditions of the rectifier. When the rectifier is hot more air is passed through the conduit 13 and when it is cool less air is passed through this conduit in response to the regulating device described.

The operation of the apparatus shown in the drawing is as follows: Assuming, for example, that the system shown in Figure 1 is filled with the proper quantities of ammonia, water and hydrogen, which acts as refrigerant, absorption liquid and inert gas, respectively, in accordance with known practice and that the liquid pump 18 and gas pump 22 are put into operation and that heat is supplied through the heating tube 11 to the boiler, the ammonia will pass through a cycle from the boiler B where it is generated, upwardly through the vertical conduit 14 and then through the conduit 15 into the rectifier. In the rectifier the entrained water vapor will be removed and flow back to the boiler, the ammonia continuing upwardly through the conduit 23 into the condenser where it will be liquified and flow into the evaporator through the conduit 24. In the evaporator the ammonia will evaporate to produce a refrigerating effect and flow through the conduit 19 into the absorber where it will be absorbed by the water and returned to the boiler B through the conduit 16.

In the meantime the water will be circulated between the boiler B and the absorber A, the water leaving the boiler through the conduit 17 and being forced into the absorber A by means of the pump 18. From the absorber it will return to the boiler B through the conduit 16.

Likewise, the inert gas will be circulated between the evaporator and the absorber, the gas leaving the absorber at the righthand side thereof as viewed in Figure 1, and passing upwardly through the conduit 21 under the influence of the gas pump 22. After flowing upwardly through the evaporator the gas returns to the absorber through the conduit 19.

The ammonia vapor and water vapor which leave the boiler are at a high temperature as they enter the rectifier R. They heat up the rectifier and must be cooled down a certain amount before the entrained water vapor can be separated from the ammonia. On the other hand, if they are cooled down too much, a large quantity of ammonia will also be liquified in the rectifier and the efficiency of the system will be impaired. In accordance with the present invention, the bellows and damper illustrated for controlling the amount of air flowing over the cooling fins 26 on the rectifier provide means for maintaining the interior of the rectifier at the proper temperature for most advantageous operation.

In a simple air-cooled rectifier as normally used in continuous absorption systems of the small or household size, the amount of rectification depends upon the room temperature. In accordance with the present invention the amount of rectification may be to a large extent independent of the room temperature but dependent solely upon the temperature of the upper part of the rectifier column. The rectifier may thus be maintained at a fairly constant optimum temperature by the use of cooling fins on the rectifier and a damper regulating the amount of air that flows over these cooling fins.

The area of the cooling fins 26 should be sufficient to maintain the temperature of the top of the rectifier column at the optimum working temperature, in a room of say a temperature of 100° F. when the damper 34 is wide open to allow a large quantity of air to pass upwardly through the air conduit 13. If the room cools down to a temperature say of 50° F. this optimum temperature may still be maintained by closing the damper sufficiently to prevent the passage of cold air across the fins which would lower the temperature of the rectifier below the most desirable point.

In the arrangement illustrated in Figure 1 the bellows 29 is dependent partly upon the temperature of the upper part of the rectifier and partly upon the temperature of the air passing upwardly along the walls of the air conduit 13 so that the bellows responds to both the temperature of the air in the conduit 13 and the temperature of the rectifier R. In order to obtain the best temperature control of the rectifier it may be desirable to isolate the bellows to some extent from the air around the rectifier and to make it dependent solely upon the temperature of the upper portion of the rectifier column. The bellows may be easily isolated from the gas in the air conduit 13. One way of doing this would be to provide a metal cylinder open at the top and closed at the bottom, into which the bellows 29 might be placed. This shield might be connected by tubes to the air outside of the conduit 13 if desired.

It should also be mentioned that although a sylphon bellows is shown as the means for operating the damper, it will be understood by those skilled in the art that a bi-metallic strip or coil could be used in place of the bellows. Various other temperature responsive devices known in the art could be advantageously employed in accordance with this invention. Various other changes might be made without departure from the spirit of the invention or the scope of the annexed claims.

I claim:

1. An air-cooled rectifier assembly adapted for use in an absorption refrigerating system, said assembly comprising a vessel having heat discharge means thereon exposed to the air and means responsive to the temperature of a portion of said vessel operable to permit an increase in the air flow over said heat discharging means when the temperature of said portion is raised and a decrease in the air flow over said heat discharging means when the temperature of said portion is lowered.

2. The method of controlling the condensation of gaseous absorption fluid driven off in the generator of a continuous absorption type refrigeration system which comprises generating a refrigerant gas from an absorption fluid by applying heat thereto, condensing gaseous absorption fluid which may be driven off with the gaseous refrigerant, such condensation being accomplished by passing a room air in heat exchange relation, but out of contact with said gaseous absorption fluid, and controlling the flow of said room air in accordance with the temperature of the gaseous absorption fluid.

3. The method of controlling the condensation of gaseous absorption fluid driven off in the generator of a continuous absorption type refrigeration system which comprises generating a refrigerant gas from an absorption fluid by applying a flame thereto, condensing gaseous absorption fluid which may be driven off with the gaseous refrigerant without condensing said refrigerant, such condensation being accomplished by passing a cooling fluid in heat exchange relation, but out of contact with said gaseous absorption and refrigerant fluids, causing said flow of cooling fluid by the upward flow of gases from said heating flame, and controlling the flow of cooling fluid in accordance with the temperature of the gaseous absorption fluid.

4. An absorption refrigeration apparatus including a refrigerant generator, a condenser and an evaporator inter-connected with one another, and means utilizing ambient air intermediate said generator and said evaporator for separating refrigerant vapor from solvent vapor, said means being controlled automatically in accordance with the thermal condition of one of said vapors and being operable to maintain a temperature at said separating means intermediate a critical temperature of each of said vapors.

5. In the combination of an absorption refrigeration apparatus of the type having a boiler, a condenser, an evaporator and an absorber in circuit, and utilizing a refrigerant fluid and a solvent therefor, that improvement which comprises automatically separating and returning solvent vapor to the boiler by utilizing ambient air for maintaining the temperature of a part of the apparatus intermediate the boiler and evaporator at a point intermediate the critical temperatures of the solvent and refrigerant vapors by controlling the rate of heat dissipation therefrom.

6. That improvement in absorption refrigeration apparatus of the air-cooled type having a boiler, a condenser and an air cooled rectifier interconnected between said boiler and condenser and operable to condense and return absorbent vapor to the boiler which may be contained in refrigerant vapor flowing from the boiler to the condenser, which improvement comprises passing a confined body of atmospheric air in heat exchange relation with said air-cooled rectifier to absorb the heat of condensation of the absorbent vapor, and controlling the flow of said cooling air in accordance with the temperature conditions in said rectifier whereby sufficient heat is removed therefrom to condense the absorbent vapor but not the refrigerant vapor.

7. Absorption refrigeration apparatus including a boiler, a condenser and means interconnecting the boiler and condenser including a rectifier, means forming an air passageway over said rectifier, means employing waste heat from said boiler heating means for causing circulation of atmospheric air through said passageway, and means for controlling the effectiveness of said last named means whereby the flow of air may be limited to that necessary to absorb the heat of condensation of the absorbent vapor in said rectifier.

8. Absorption refrigeration apparatus including a boiler, a rectifier and a condenser connected in circuit, means forming an air passageway over said rectifier, means for heating said boiler including a flue connected to said air passageway so as to induce a flow of atmospheric air through the passageway whereby the flow of cooling air is a function of the heat supplied to the boiler, and thermostatic means responsive to the temperature of the vapors in said rectifier operative to supplement the control of the cooling air flow over said rectifier.

9. That improvement in means for controlling the operation of rectifiers for use in absorption refrigeration apparatus of the type having a boiler, heating means therefor and a rectifier, which improvement comprises utilizing the products of combustion from said boiler heating means to produce a flow of cooling air over said rectifier which flow is in proportion to the heat supplied to the boiler and the temperature of the products of combustion, and additionally controlling said cooling air flow in accordance with the temperature conditions of said rectifier in such manner that the internal temperature of said rectifier is maintained intermediate the critical temperatures of the refrigerant vapor and the absorbent vapor therein.

10. Absorption refrigeration apparatus including a boiler assembly at a low level, a condenser at a higher level, an air cooled rectifier in a conduit interconnecting said boiler assembly and condenser, an air flue about said rectifier whereby the heat absorbed therefrom causes a flow of atmospheric air therethrough, and thermostatic means responsive to the temperature condition of said rectifier and operative to control air flow through said flue in such a way that absorbent vapor but not refrigerant vapor in said rectifier is condensed.

11. That method of controlling the separation of a mixture of absorbent vapor and refrigerant vapor passing from the refrigerant generating zone to the condensing zone in the absorption method of producing refrigeration wherein heat is applied to the generating zone, which method comprises causing a stream of atmospheric air to flow in heat exchange relation with said vapor mixture to absorb the heat of condensation of the absorbent vapor by means of and in accordance with the heat supplied to the generating zone whereby when a greater quantity of heat is supplied to the generating zone there is a greater flow of cooling air to carry away the heat of condensation of the absorbent vapor, the flow of atmospheric cooling air being additionally controlled in accordance with the temperature conditions of said vapor mixture in such a way that at higher temperatures heat supplied to said generating zone produces a greater flow of cooling air.

CURTIS C. COONS.